(12) United States Patent
Johnson, Jr.

(10) Patent No.: US 7,396,052 B2
(45) Date of Patent: Jul. 8, 2008

(54) SANITARY SEALED CONNECTOR FOR FLUID HANDLING SYSTEMS AND STORAGE DEVICES

(75) Inventor: Eric K. Johnson, Jr., Edgewood, KY (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 10/927,736

(22) Filed: Aug. 27, 2004

(65) Prior Publication Data
US 2006/0043734 A1   Mar. 2, 2006

(51) Int. Cl.
*F16L 17/00* (2006.01)
(52) U.S. Cl. ................. 285/365; 285/363; 285/407
(58) Field of Classification Search ............... 285/99, 285/328, 407–410, 330, 913, 365, 363; 277/602, 277/606, 608, 609, 616
See application file for complete search history.

(56) References Cited

U.S. PATENT DOCUMENTS

| | | | | |
|---|---|---|---|---|
| 1,267,313 | A | * | 5/1918 | Cook ................... 285/330 |
| 1,302,314 | A | * | 4/1919 | Cornell ................ 285/279 |
| 1,542,940 | A | * | 6/1925 | Hughes ................ 285/412 |
| 1,935,673 | A | * | 11/1933 | Smith et al. ......... 285/328 |
| 2,789,844 | A | | 4/1957 | Kessler |
| 4,003,590 | A | * | 1/1977 | Hefel ................... 285/328 |
| 4,660,869 | A | * | 4/1987 | Gabus .................. 285/365 |
| 5,320,389 | A | * | 6/1994 | Dupont, Jr. .......... 285/915 |
| 5,645,301 | A | * | 7/1997 | Kingsford et al. ... 285/331 |
| 6,073,969 | A | | 6/2000 | Zimmerly |
| 6,234,545 | B1 | | 5/2001 | Babuder et al. |
| 6,832,762 | B2 | * | 12/2004 | Jost ...................... 277/602 |

* cited by examiner

*Primary Examiner*—Aaron Dunwoody (57) ABSTRACT

A sanitary connector apparatus includes first and second tubular members coaxially aligned such that a first member end of the first tubular member is positioned toward a second member end of the second tubular member. First and second sealing components radially extend from the first and second member ends, respectively. An annular groove is formed into the first end face of the first sealing component and a corresponding resilient rib is integrally formed with the second end face of the second sealing component. A clamp band, secured around the outer perimeter of the first and second sealing components, has two extension members that apply compressive force to the sealing components in a direction coaxial to the tubular members. The compressive force applied is sufficient to compress the resilient rib into the corresponding groove and position the first end face against the second end face.

16 Claims, 13 Drawing Sheets

SANITARY SEALED CONNECTOR FOR FLUID HANDLING SYSTEMS AND STORAGE DEVICES

BACKGROUND OF INVENTION

Traditionally, sanitary connectors used in fluid handling systems and storage devices, such as pipes and bottles, are four-piece connectors. The most common such connector includes a resilient O-ring retained between two metal flanges. Each metal flange typically includes an annular ring within which outwardly protruding ribs on each side of the O-ring are compressed. A clamp secures the flanges and provides the force required to compress the protruding ribs into the annular flanges and seal the connection. The groove-bearing flanges are machined from metal and may then be brazed, bonded, welded, soldered, or otherwise attached to tubular members. The O-ring is formed from a resilient material that compresses to fit within the aligned grooves when pressure is applied to the flanges.

While this four-part design has continued to be used to provide a sealed connection between adjoining pipes and to seal storage devices, the machined metal components add both cost and weight to the fluid handling device or storage container. Additionally, the labor required to assemble the connector includes assembling four pieces to ensure the connection is sealed.

To reduce the labor component of assembling sanitary connectors to a fluid handling device or storage container, it would be an improvement to the art to have a connector with fewer pieces to assemble. Fewer parts results in less assembly time, lower labor costs, and improved quality.

To reduce the weight of fluid handling devices and storage containers that include sanitary connectors, it would be a further improvement to the art to provide a connector that may have one or both flanges formed from a material that weighs less than the traditional machined flanges.

To reduce the cost associated with the producing machined and welded connector components, it would be an improvement to the art to have a connector that may be formed from a molding process. Despite this need, there exists an absence of devices designed to address the above noted desired improvements.

SUMMARY

In a first aspect of the claimed subject matter, a sanitary connector apparatus includes first and second tubular members coaxially aligned such that a first member end of the first tubular member is positioned toward a second member end of the second tubular member. First and second sealing components radially extend from the first and second member ends, respectively. An annular groove is formed into the first end face of the first sealing component and a corresponding resilient rib is integrally formed with the second end face of the second sealing component. A clamp band, secured around the first and second component outer surfaces of the first and second sealing components, applies compressive force to the sealing components in a direction coaxial to the tubular members. The compressive force applied is sufficient to compress the resilient rib into the corresponding groove and to position the first end face against the second end face.

In a second and separate aspect of the claimed invention, a sanitary connector includes a pair of opposed sealing components, wherein the first of the opposed sealing components has two or more annular grooves in the first end face. The second sealing component includes a corresponding quantity of annular resilient ribs integrally formed with the second sealing component and extending outward from the second end face. The resilient ribs are coaxially aligned with the grooves. A clamp band provides a compression force to the sealing components sufficient to compress the resilient ribs into the annular grooves and to hold the first end face against the second end face.

In a third aspect of the claimed invention, a sanitary connector includes a pair of opposed sealing components, wherein the first of the opposed sealing components has a first annular groove and a first resilient rib in the first end face. The second sealing component includes a second resilient rib corresponding to the first annular groove and a second annular groove corresponding to the first resilient rib. The first and second resilient ribs are coaxially aligned with the corresponding second and first annular grooves, respectively. A clamp band provides a compression force to the sealing components sufficient to compress the resilient ribs into the annular grooves and to hold the first end face against the second end face.

In a fourth aspect of the claimed invention, a first sealing component radially extends from a first member end of a first tubular member. An annular groove is formed into a first end face of the first sealing component. A second sealing component of the sanitary fitting has a resilient rib integrally formed with the second end face and the second sealing component is incorporated into a cover that to prevent fluid communication from the first tubular member through the first member end. A clamp band secures the first and second sealing components together. Alternatively, the first sealing component is incorporated into a cover that prevents fluid communication from the second tubular member through the second member end. This embodiment is beneficial for fluid storage devices.

In a fifth aspect of the claimed invention, the first and second sealing components are formed to encapsulate the first and second member ends of the first and second tubular members. Thus, the tubular members may be formed from metal, while the first and second sealing components are molded polymer material. The sealing components are molded around the ends of each tubular member. The sealing components are then clamped together with the clamp band to form a sealed sanitary connection.

In a sixth aspect of the claimed invention, a strengthening ring is insert molded into the resilient rib extending from the sealing component to provide additional support to the rib. The metal ring may be wholly encapsulated within the rib and sealing component.

These and other features of the present invention are more fully set forth in the following description.

DETAILED DESCRIPTION

Figure 1:
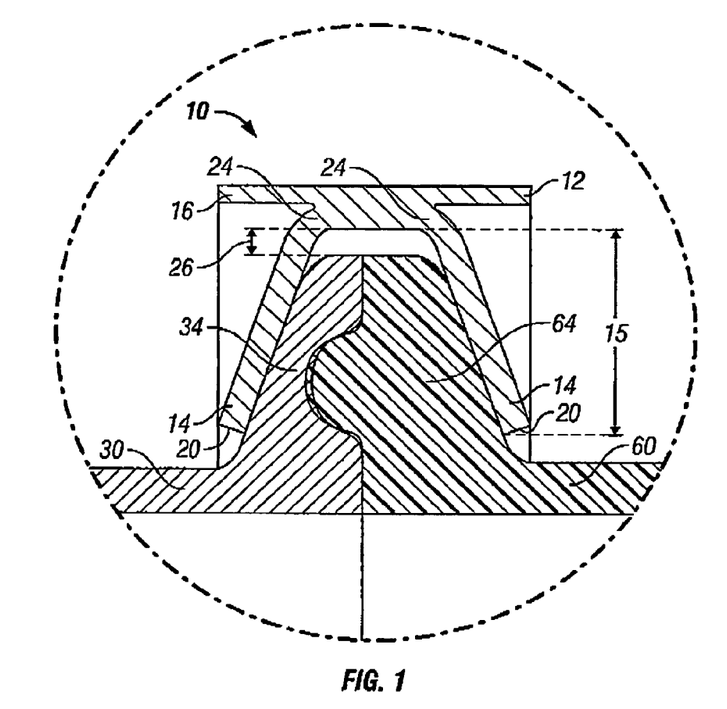
FIG. 1 is a cross sectional view of a sanitary connector for a fluid handling device.

Referring to FIG. 1, a first embodiment of a sanitary connector 10 is depicted. The basic components of the sanitary connector 10 include a first tubular member 30, a second tubular member 60, and a clamp band 12.

Figure 2:
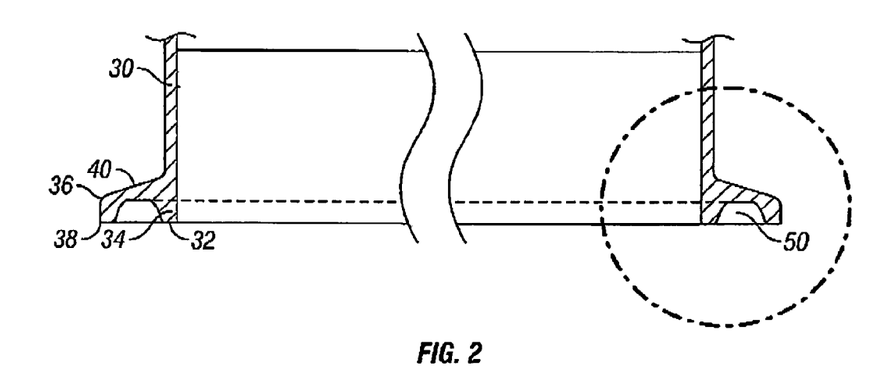
FIG. 2 is a cross sectional view of the first tubular member.
Figure 3:
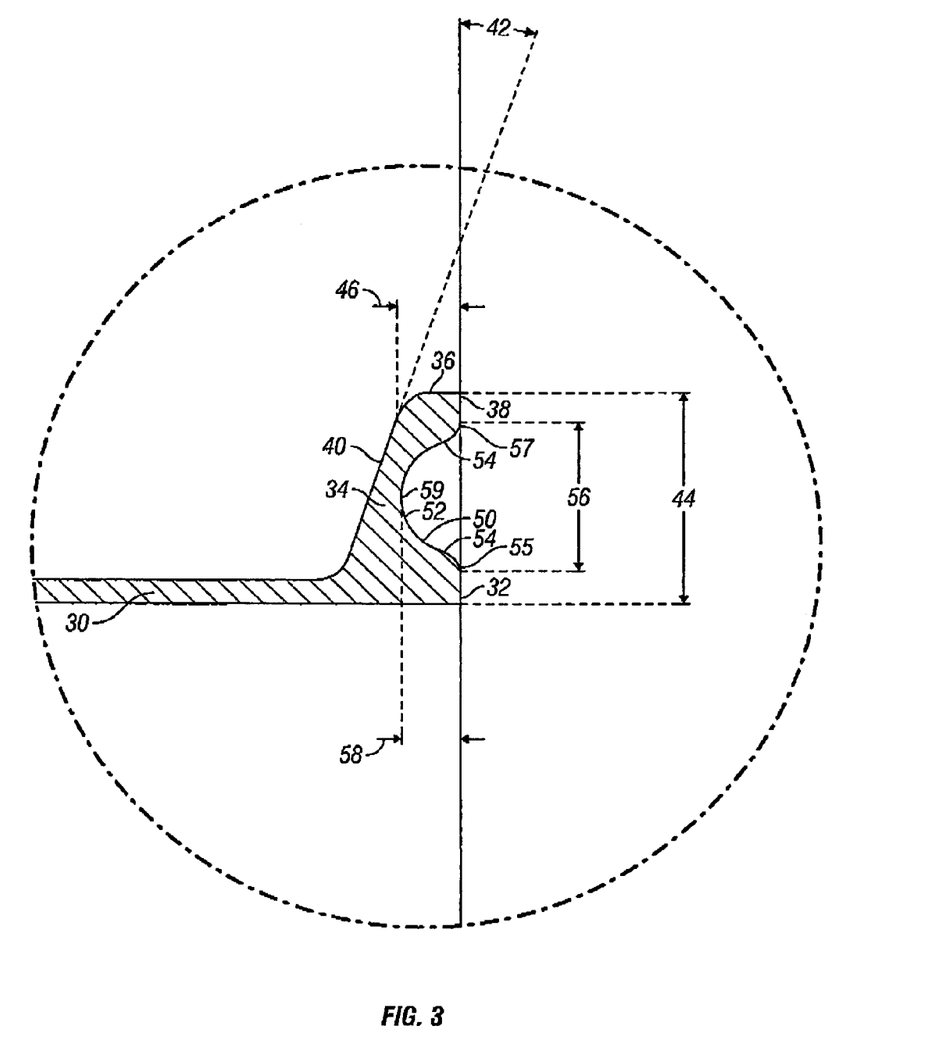
FIG. 3 is a cross sectional view of the first sealing component.

As may be seen in FIGS. 2 and 3, the first tubular member 30 has a first member end 32 from which a first sealing component 34 radially extends outward to a first component outer surface 36, encircling the first member end 32. The first sealing component 34 has a first end face 38 that is substantially flush with the first member end 32 and has a first end face width 44 (shown in FIG. 3). A first component back surface 40 extends between the first tubular member 30 and the first component outer surface 36, forming a first component angle 42 (shown in FIG. 3) with first end face 38.

Referring to FIG. 3, the first sealing component 34 includes an annular groove 50 formed into the first end face 38. Annular groove 50 is defined by a groove bottom portion 52 flanked by groove walls 54. The groove bottom portion 52 has an arcuate cross sectional shape. The groove walls 54 flare outward from the groove bottom portion 52 to a groove top width 56, which is measured between a groove inner edge 55 and a groove outer edge 57, wherein the points at which each groove wall 54 meets first end face 38. Annular groove 50 has a groove depth 58, as measured from first end face 38 to a groove bottom point 59.

Figure 4:
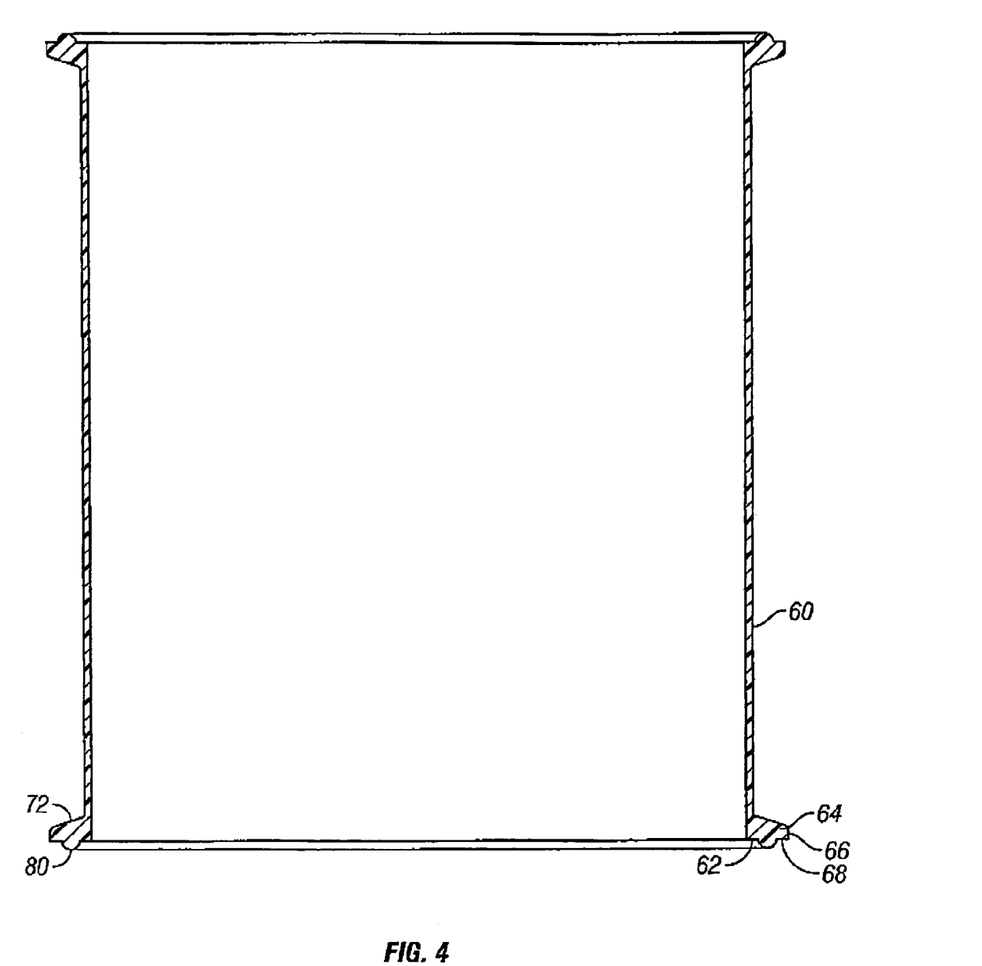
FIG. 4 is a cross sectional view of the second tubular member.
Figure 5:
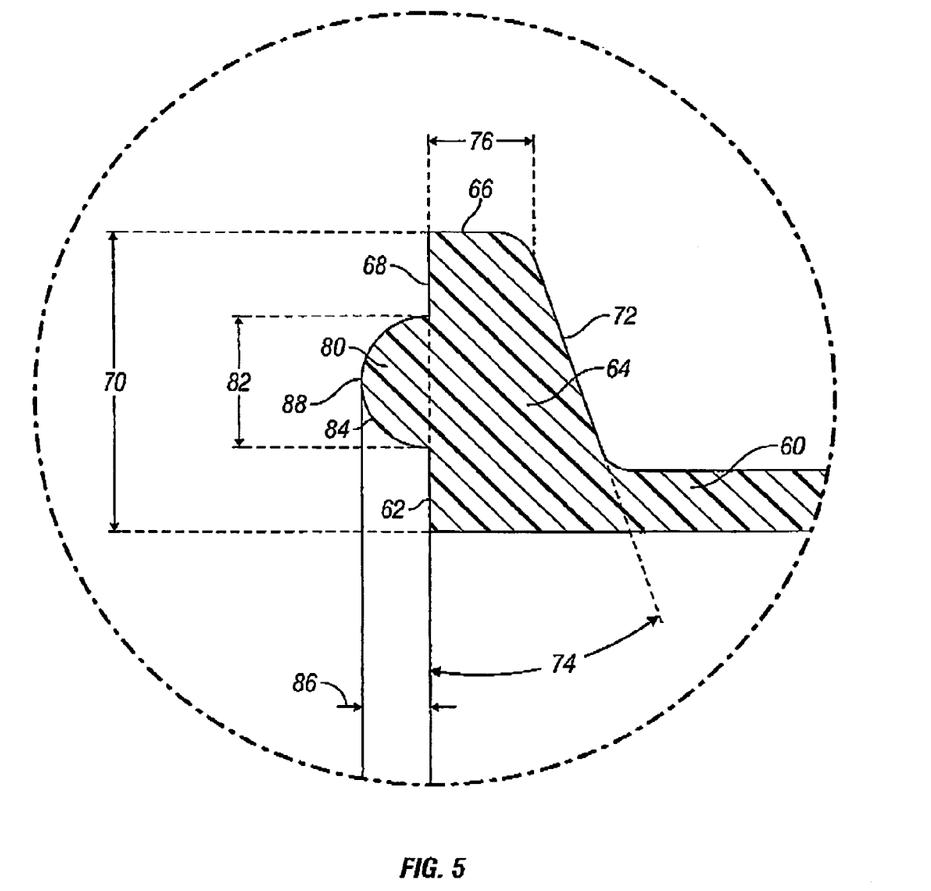
FIG. 5 is cross sectional view of the second sealing component.

As can be seen in FIGS. 4 and 5, the second tubular member 60 has a second member end 62 from which a second sealing component 64 radially extends outward to a second component outer surface 66. The second sealing component 64 includes a second end face 68 that is substantially flush with the second member end 62. A second component back surface 72 extends between the second tubular member 60 and the second component outer surface 66, forming a second component angle 74 with second end face 68.

Referring to FIG. 5, the second sealing component 64 includes an integrally-formed annular, resilient rib 80 extending from the first end face 38. The rib 80 has a rib width 82 measured between cross sectional points at which the rib surface 84 meets second end face 68. The rib 80 also has a rib height 86, which is the distance from the second end face 68 to a rib apex 88 located at the farthest-most point from the second end face 68.

Polymeric material may be used to achieve the resiliency required of rib 80. The rib 80 and the second sealing component 64 may be formed from the same material. Alternatively, by utilizing injection molding techniques such as two-shot molding or co-injection molding, the rib 80 may be formed from a separate material than the second searing component 64 while still remaining integrally formed with the second sealing component. Thus, the material used to form the rib 80 may exhibit different characteristics than the material used to form the second sealing component 64.

Figure 6:
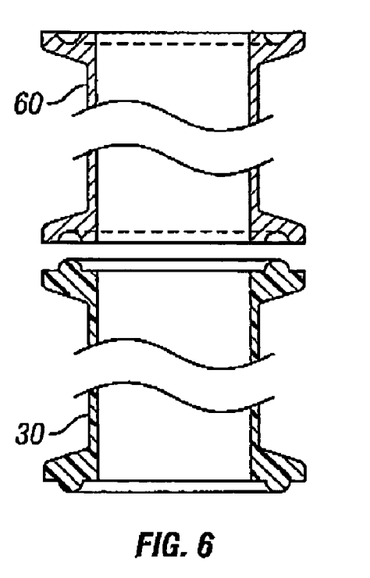
FIG. 6 is cross sectional view of the first and second tubular members.

As can be seen in FIG. 6, the first sealing component 34 on the first tubular member 30 is positioned adjacent to the second sealing component 64 on the second tubular member 60 when the first tubular member 30 and the second tubular member 60 are in coaxial alignment. The first end face 38 has a first end face width 44, shown in FIG. 3, which is equal to a second end face width 70 of second end face 68, shown in FIG. 5.

The rib 80 is formed with a rib height 86 that is larger than the corresponding groove width 82. Thus, when the rib 80 is positioned within the annular groove 50 without the application of compressive force, the rib height 86 prevents the second end face 68 from being seated directly against the first end face 38. The annular groove 50 is formed with a groove width 56 that is greater than the corresponding rib width 82, resulting in a space between each groove wall 54 and the adjacent rib surface 84 when there is no compressive force on the first and second sealing components 34 and 64.

As compressive force is applied to the first and second component back surfaces 40 and 72, the resilient rib 80 deforms and compresses until the rib surface 84 contacts groove walls 54 and the first end face 38 is against the second end face 68. Thus, the rib 80 must be sufficiently deformable to fill the annular groove 50 and form a sealed interface.

As previously stated, the rib 80 and the second sealing component 64 may be formed from die same resilient material or the rib 80 and the second sealing component 64 may be integrally formed from different materials. When the rib 80 and second sealing component 64 are formed from a single material, the material selected for the rib 80 should have the same or a lower durometer (i.e. softer) than the material selected for the first sealing component 34. The rib 80 material should have a durometer sufficiently soft enough that the rib 80 will deform to match the shape of the annular groove 50 while the second sealing component 64 material has a durometer sufficiently hard enough that the application of compressive force will be transferred through the second sealing component 64 to the rib 80. Likewise, the material selected for the first sealing component should be of a sufficient hardness to transfer compressive force to the rib 80. The first sealing component 64 may be of a material having a different durometer (harder or softer) than the second sealing component 64.

Figure 7:
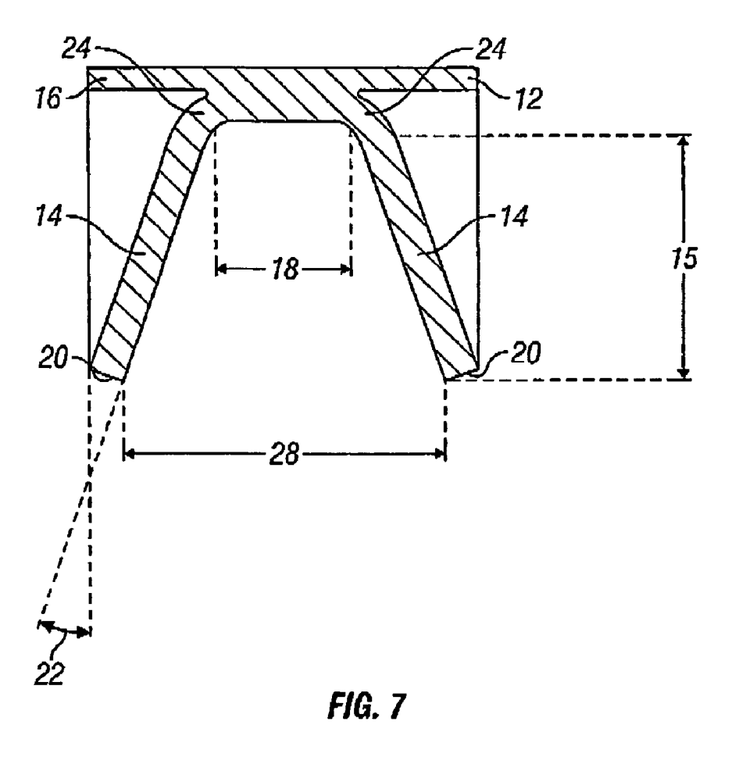
FIG. 7 is a cross sectional view of the clamp band.

Referring to FIGS. 1 and 7, a clamp band 12 is secured around the first and second outer surfaces 36 and 66 of the first and second sealing components 34 and 64. A band outer member 16 is positioned circumferentially about the first and second outer surfaces 36 and 66. Two extension members 14 are each attached to the band outer member 16 along attachment ends 24 and are spaced apart at the free ends 20 such that first and second sealing components 34 and 64 may be received between extension members 14. Attachment ends 24 of first and second extension members 14 may be spaced apart by a clamp inner width 18. Free ends 20 are spaced apart by a free end width 28. Free end width 28 may be greater than clamp inner width 18, thereby defining a clamp angle 22 between the two extension members 14.

Clamp band 12 provides the compression force to the first and second sealing components 34, 64 sufficient to deform the rib 80 to fill the annular groove 50 and to retain first end face 38 against second end face 68. To provide such a force, the clamp angle 22 is equal to or slightly less than the sum of the first component angle 42 and the second component angle 74. In addition, each extension member 14 has an extension member length 15 sufficient to apply force along first and second component back surfaces 40 and 72 between a point near first and second component outer surfaces 36 and 66 and a point opposite the groove inner edge 55, as projected to first and second component back surfaces 40 and 72 in a direction parallel to first and second tubular members 30 and 60. As the band outer member 16 is tightened around the first and second component outer surfaces 36 and 66, the extension members 14 are forced downward over first and second component back surfaces 40 and 72. The first and second sealing components 34 and 64 are thereby compressed between the extension members 14. The clamp inner width 18 may be less than the sum of the first and second outer widths 46 and 76, preventing the first and second outer surfaces 36 and 66 from seating against the band outer member 16 and resulting in a gap 26 between the clamp band 12 and the first and second component outer surfaces 36 and 66.

Figure 8A:
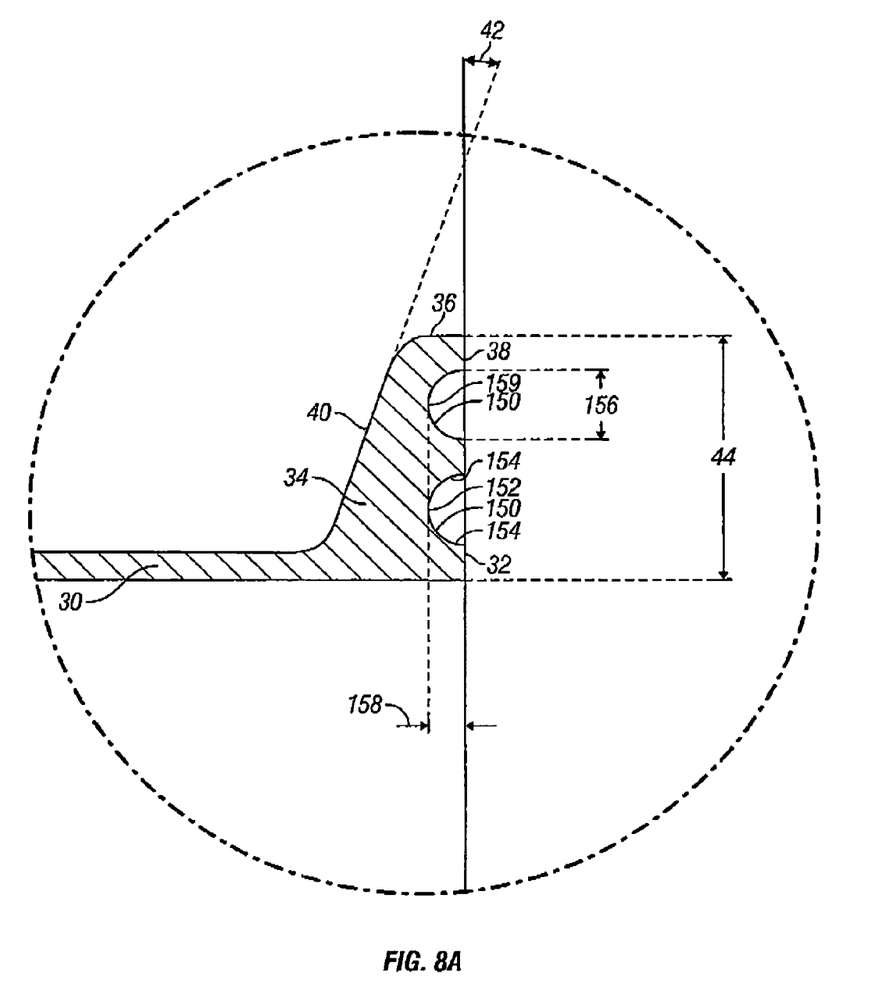
FIG. 8a is a cross sectional view of another embodiment of the first sealing component.
Figure 8B:
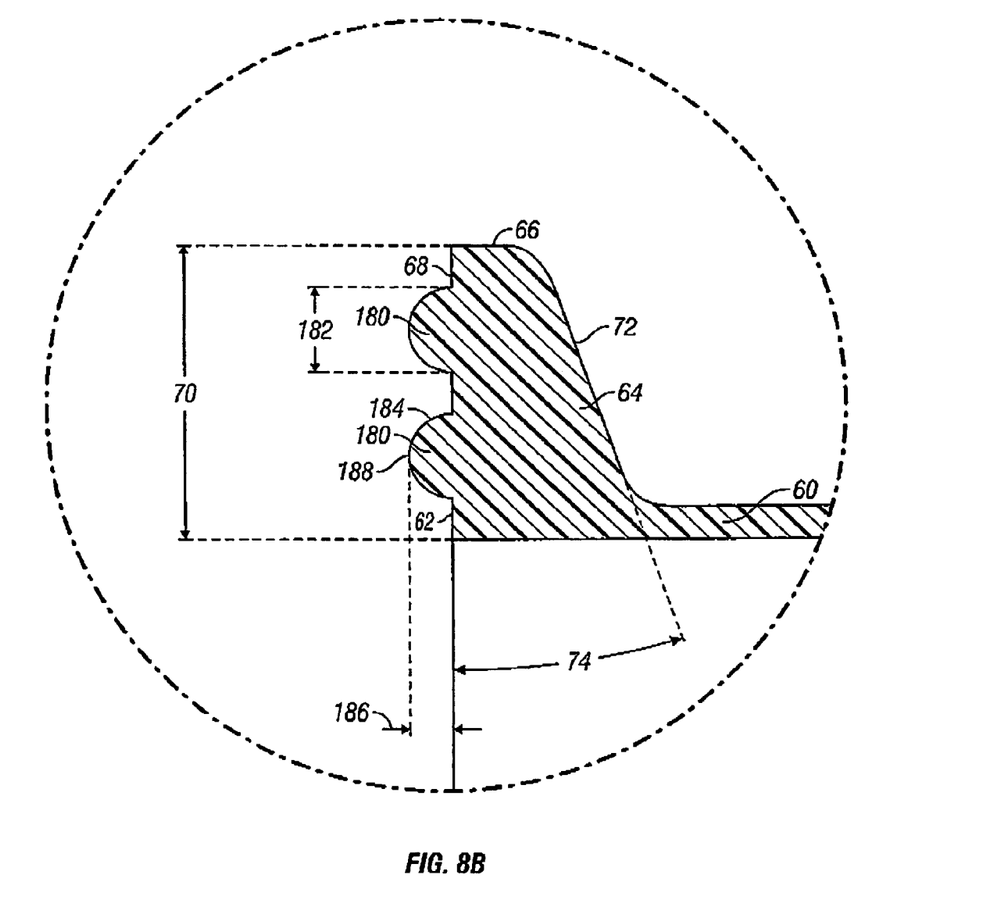
FIG. 8b is a cross sectional view of another embodiment of the second sealing component.

Referring to FIGS. 8a and 8b, it is contemplated that there may be more than one annular groove 150 in the first end face 38 and a corresponding quantity of ribs 180 on second end face 68. The interface between each of the several ribs 180 and the respective annular grooves 150 is similar to that of the single rib 80 and single annular groove 50 in that each rib height 186 is greater than the corresponding groove depth 158 and each groove top width 156 is greater than the corresponding rib width 182. Each rib 180 is compressible and deformable to fill the corresponding annular groove 150 upon the application of compressive force to the first and second sealing components 34 and 64.

Figure 9A:
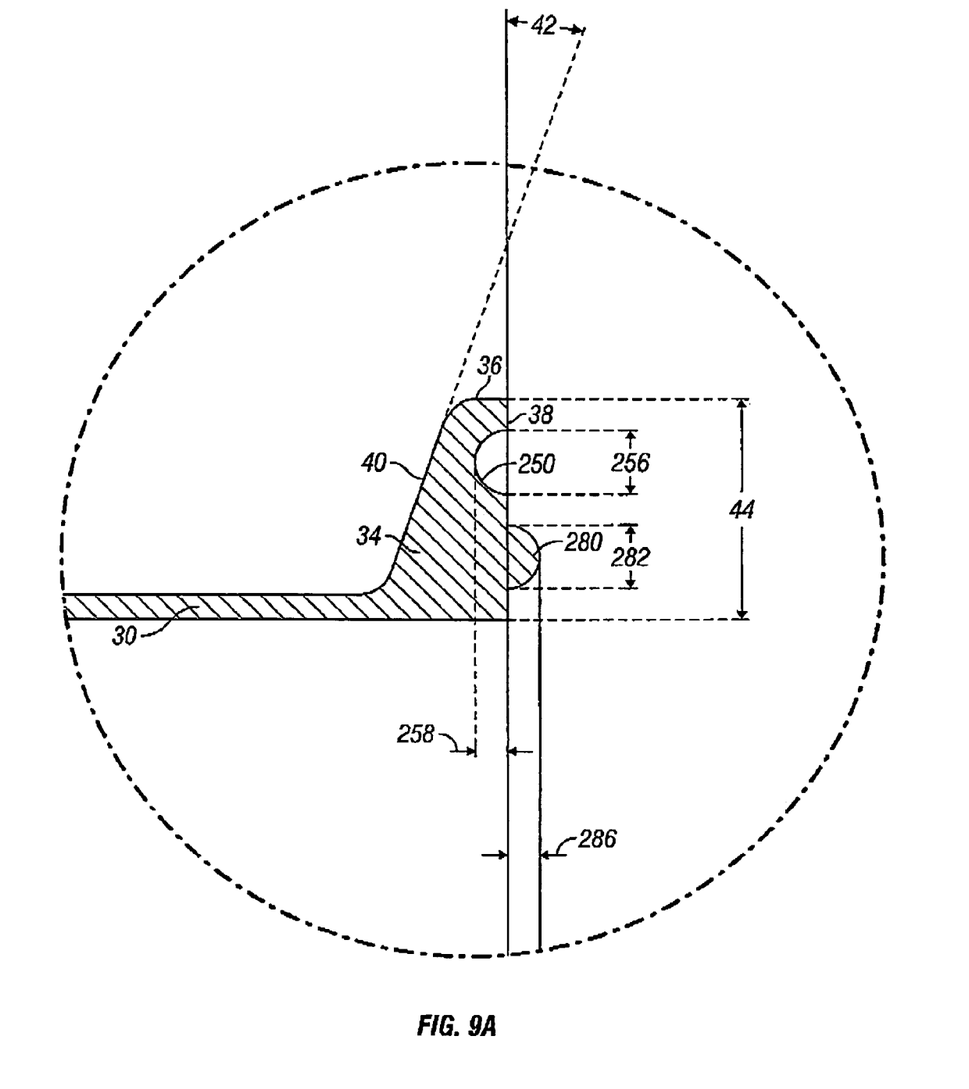
FIG. 9a is a cross sectional view of another embodiment of the first sealing component.
Figure 9B:
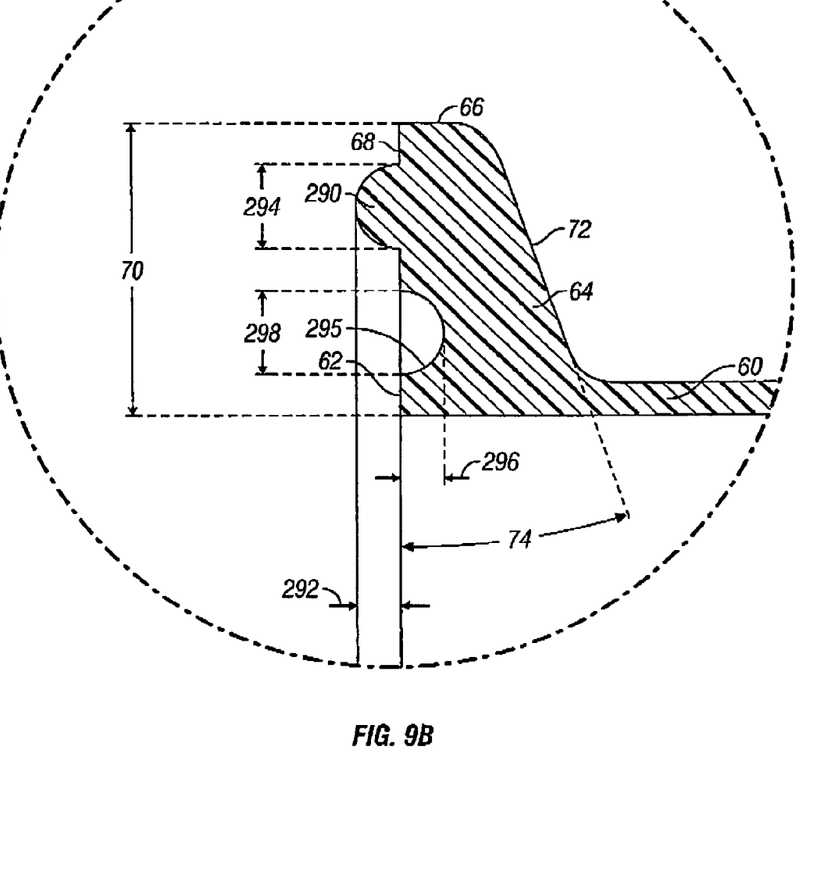
FIG. 9b is a cross sectional view of another embodiment of the second sealing component.

Another embodiment is shown in FIGS. 9a and 9b. In this embodiment, the first end face 38 has a first annular groove 250 and a second resilient rib 280. The second end face 68 includes a first resilient rib 290, which corresponds to the first annular groove 250. The second end face 68 further has a second annular groove 295, which corresponds to the second resilient rib 280. The first rib 290 has a first rib height 292 that is greater than the corresponding first groove depth 258 of the first annular groove 250 and the second rib 280 has a second rib height 286 that is greater than the second groove depth 296 of the second annular groove 295. The first and second groove top widths 298, 256 are each greater than the corresponding first and second rib widths 294 and 282. Each rib 290 and 280 is compressible and deformable to fill the corresponding annular groove 250 and 295 upon the application of compressive force to the first and second sealing components 34 and 64.

Figure 10A:
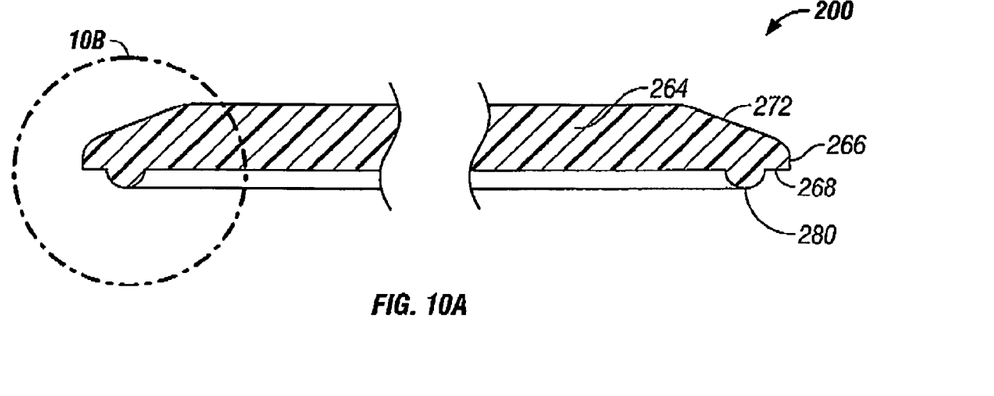
FIG. 10a is a cross sectional view of an embodiment of the second sealing component.
Figure 10B:
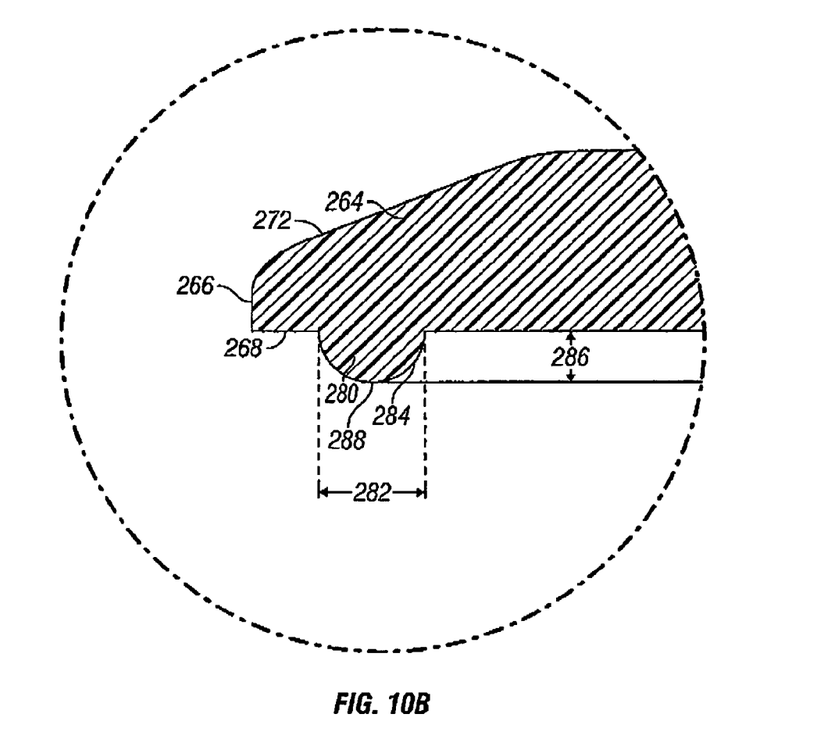
FIG. 10b is a detailed cross sectional view of an embodiment of the second sealing component.

In another embodiment, depicted in FIGS. 10a and 10b, the second sealing component 264 forms a cover 200 that may be used to enclose the first member end 232 of the first tubular member 230, thereby preventing further fluid flow. This embodiment is useful for various fluid handling devices, including bottles or other devices used to transport fixed quantities of fluids. This embodiment may also be useful for sealingly preventing fluid communication through a particular fluid passageway.

Although only the second sealing component 264 is depicted as forming cover 200, it is contemplated that the cover 200 may be formed by first sealing component 34.

When cover 200 is formed by second sealing component 264, the second sealing component 264 is a plate-like structure without an orifice therethrough. The second component back surface 272 and second component outer surface 266 have a relative shape substantially similar to the tubular embodiment described in detail above. The rib 280 is located along the second end face 268 to interface with a corresponding annular groove 50.

The cover 200 may be entirely injection molded from a desired material having a durometer providing sufficient deformation to the rib 280. Alternatively, the cover 200 may be formed of a first material and the rib 280 formed of a second, softer material as previously described.

Figure 11:
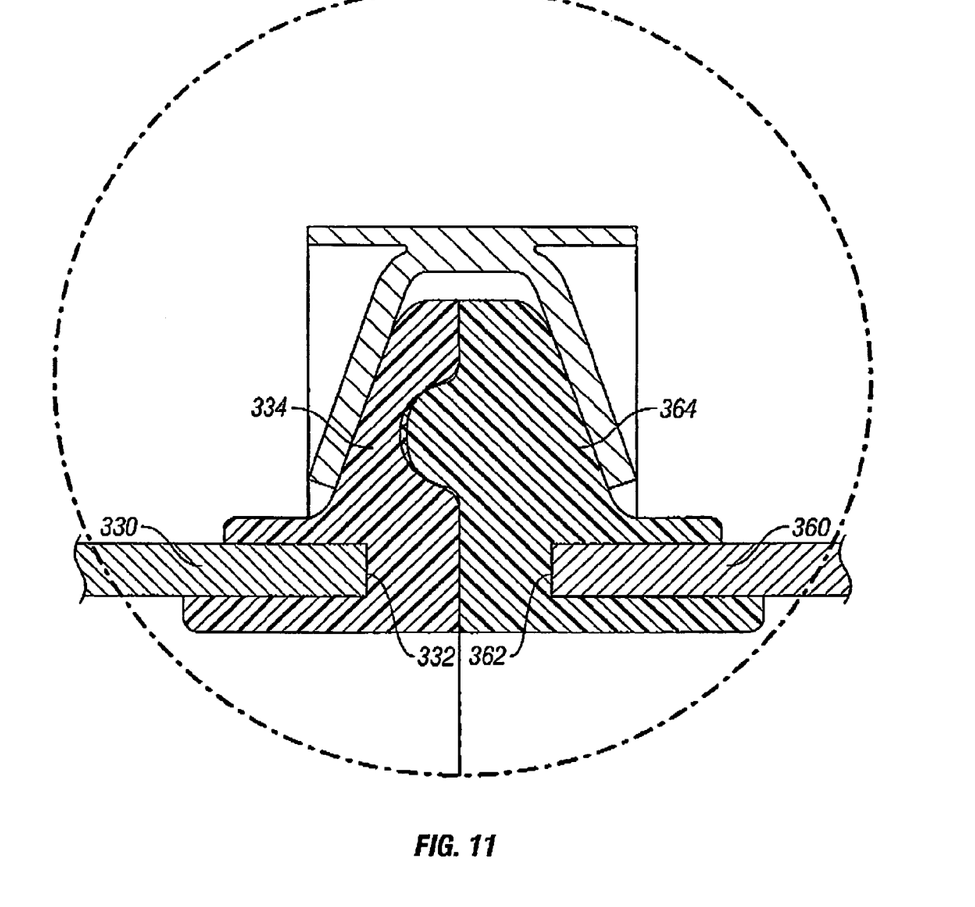
FIG. 11 is a cross sectional view of an embodiment of the sanitary connector.

Referring to FIG. 11, in another embodiment, the first and second sealing components 334 and 364 are formed around the first and second member ends 332 and 362 of first and second tubular member 330 and 360, respectively. In this embodiment, the first and second sealing components 334 and 364 may be molded around the first and second member ends 332 and 362 to retrofit and connect preexisting tubular members in addition to forming new sanitary connectors.

Figure 12:
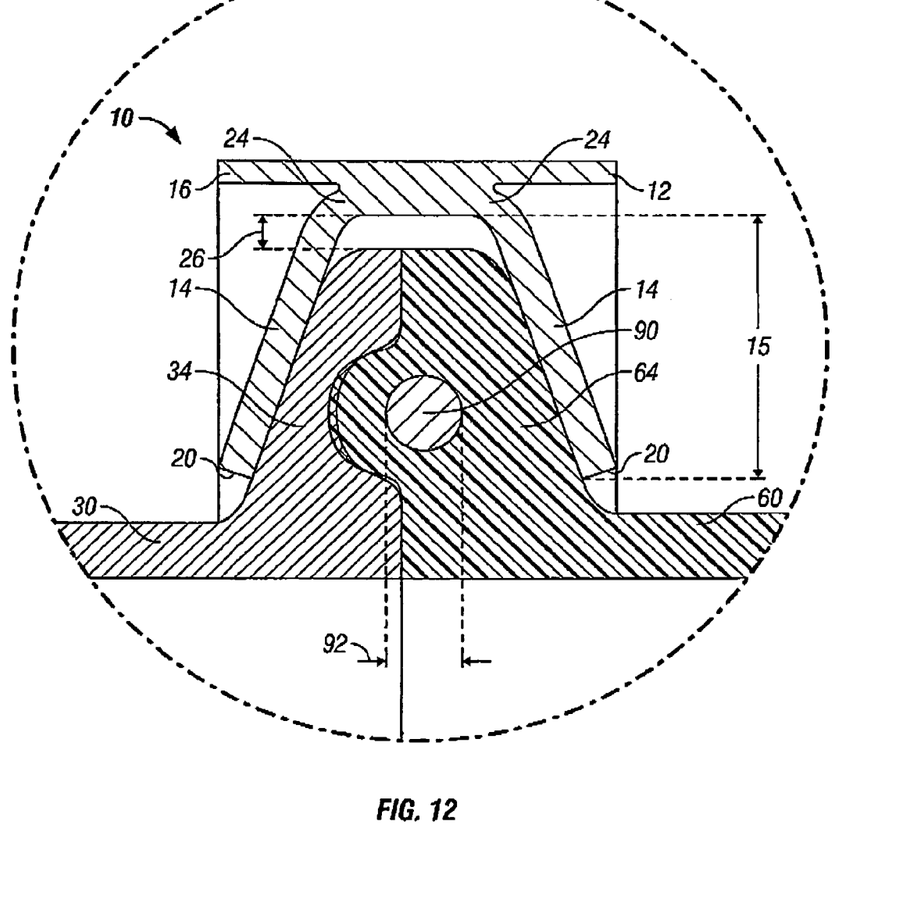
FIG. 12 is a cross sectional view of an embodiment of the sanitary connector with a strengthening rib.
Figure 13:
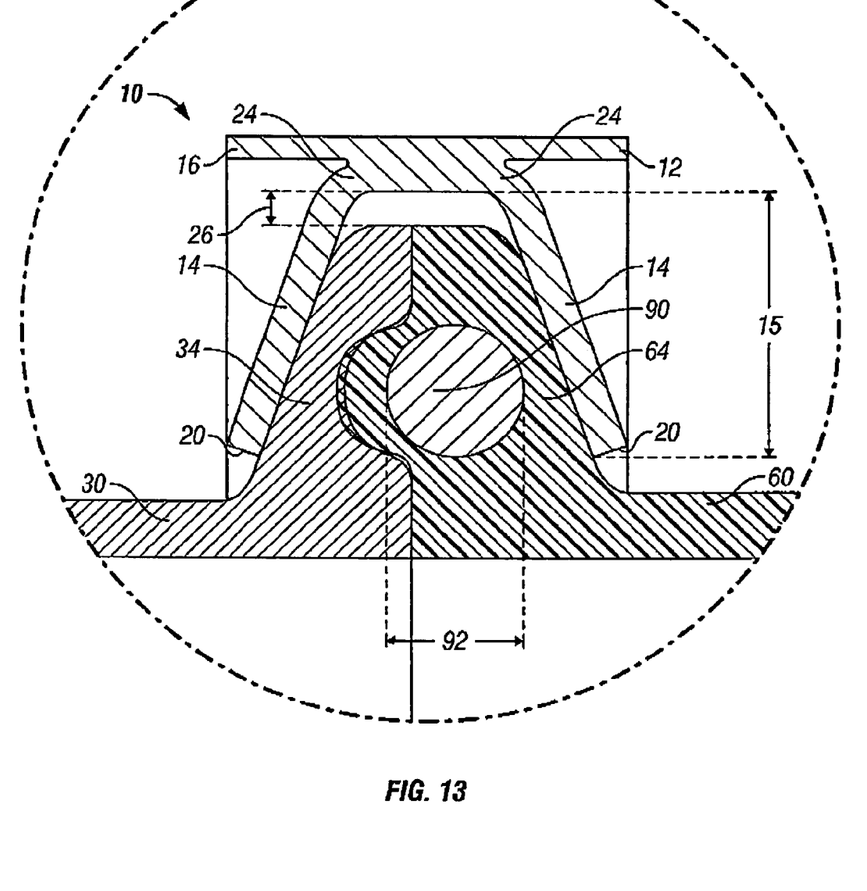
FIG. 13 is a cross sectional view of an embodiment of the sanitary connector with a strengthening rib.

FIGS. 12 and 13 depict other embodiments of the sanitary connector 10, which include a strengthening ring 90. The strengthening ring 90 may be a metal or a hard plastic ring wholly or partially encapsulated within the resilient rib 80 and second sealing component 64.

In the embodiment shown in FIG. 12, a strengthening ring 90 is located within the resilient rib 80. Held within the resilient rib 80, the strengthening ring 80 provides additional support to the resilient rib 80. In this embodiment, the strengthening ring 90 is held within the resilient rib 80 and the second sealing component 64 and has a cross sectional diameter 92 less than the rib width 82.

Alternatively, as depicted in FIG. 13, the strengthening ring 90 may have a cross sectional diameter 92 that is greater than the rib width 82. As the strengthening ring 90 is only partially encapsulated by the resilient rib 80, and primarily encapsulated by the second sealing component 64, additional strength is provided to the second sealing component 64 as well as the resilient rib 80.

It is understood that variations may be made in the foregoing without departing from the scope of the invention. For example, the present invention is not limited to the sanitary connectors, but is equally applicable to any application involving sealed connection utilized by a fluid handling device.

Since other modifications, changes, and substitutions are intended in the foregoing disclosure, it is appropriate that the appended claims be construed broadly and in a manner consistent with the scope of the invention.

What is claimed is:

1. A sanitary connector apparatus comprising:
   a first tubular member having a first sealing component with a first end face;
   a second tubular member having a second sealing component with a second end face coaxially aligned with and positioned adjacent to the first end face;
   the first end face having a coaxially aligned annular groove;
   the second end face having an integrally-formed annular resilient rib aligned to be received within the annular groove;
   wherein the first sealing component has a first component outer surface and a first component back surface between the first component outer surface and the first tubular member;
   wherein the second sealing component has a second component outer surface and a second component back surface between the second component outer surface and the second tubular member;
   wherein the first end face further includes a second resilient rib and the second end face further has a second annular groove therein;
   wherein the second resilient rib is aligned to be received within the second annular groove;

a clamp band including a band outer member positioned circumferentially about the first component outer surface and the second component outer surface and two extension members attached to the band outer member along respective attachment ends and having respective free ends spaced apart to receive the first sealing component and the second sealing component therebetween such that a first of the two extension members is immediately adjacent the first component back surface and the second of the two extension members is immediately adjacent the second component back surface; and wherein the clamp band is secured around the first component outer surface and the second component outer surface and applying compressive force to the first sealing component and the second sealing component sufficient to cause the resilient rib to fill the groove and to position the first end face against the second end face.

2. A sanitary connector apparatus comprising:

a first tubular member including a first member end;

a second tubular member coaxially aligned with the first tubular member and including a second member end positioned toward the first member end;

a first sealing component radially extending from the first member end to a first component outer surface;

a second sealing component radially extending from the second member end to a second component outer surface;

the first sealing component comprising a first end face having at least one annular groove therein and a first component back surface between the first component outer surface and the first tubular member;

the second sealing component comprising a second end face having at least one integrally-formed annular resilient rib extending therefrom and a second component back surface between the second component outer surface and the second tubular member;

each of the at least one annular groove having a groove top width and a groove depth;

each of the at least one resilient rib having a rib width less than the groove top width and a rib height greater than the groove depth;

the first end face positioned toward the second end face such that each of the at least one resilient rib is receivable by a corresponding groove of the at least one annular groove;

a clamp band including a band outer member positioned circumferentially about the first component outer surface and the second component outer surface and two extension members attached to the band outer member along respective attachment ends and having respective free ends spaced apart to receive the first sealing component and the second sealing component therebetween such that a first of the two extension members is immediately adjacent to the first component back surface and the second of the two extension members is immediately adjacent to the second component back surface, wherein the clamp band is secured around the first component outer surface and the second component outer surface and providing compressive force to the first sealing component and the second sealing component sufficient to deform each of the at least one resilient rib to fill the corresponding groove of the at least one annular groove, thereby forming a sealed interface.

3. The sanitary connector apparatus of claim 2, wherein the first end face further includes a first resilient rib extending therefrom and the second end face further has a first annular groove therein; and wherein the first resilient rib is receivable by the first annular groove.

4. The sanitary connector apparatus of claim 2, wherein the resilient rib and the second sealing component are formed from a polymer.

5. The sanitary connector apparatus of claim 2, wherein the resilient rib is formed from a first polymer and the second sealing component is formed from a second polymer;

the first polymer having a first durometer;

the second polymer having a second durometer equal to the first durometer.

6. The sanitary connector apparatus of claim 2, wherein the resilient rib is formed from a first polymer and the second sealing component is formed from a second polymer;

the first polymer having a first durometer;

the second polymer having a second durometer different from the first durometer.

7. A sanitary connector apparatus of claim 2, wherein the two extension members have a clamp angle therebetween and a clamp inner width between attachment ends sufficient to result in application of compressive force to the first component back surface and to the second component back surface by the two extension members when the band outer member is tightened.

8. A sanitary fitting for a fluid handling device comprising:

a first sealing component including a first end face having an annular groove therein and a first component back surface opposite first end face and a first component outer surface extending between the first component back surface and the first end face;

a second sealing component including a second end face having an integrally-formed annular resilient rib extending therefrom and a second component back surface opposite second end face and a second component outer surface extending between the second component back surface and the second end face;

the first sealing component and the second sealing component coaxially aligned with the first end face adjacent to the second end face and the resilient rib corresponding to the annular groove;

the resilient rib having a rib width and a rib height;

the annular groove having a groove width greater than the rib width, a groove depth less than the rib height;

a clamp band including a band outer member positioned circumferentially about the first component outer surface and the second component outer surface and two extension members attached to the band outer member along respective attachment ends and having respective free ends spaced apart to receive the first sealing component and the second sealing component therebetween such that a first of the two extension members is immediately adjacent to the first component back surface and the second of the two extension members is immediately adjacent to the second component back surface;

wherein the clamp band is secured around the first sealing component and the second sealing component and providing compressive force sufficient to position the first end face against the second end face and to deform the resilient rib to fill the annular groove, thereby forming a sealed interface.

9. The sanitary fitting of claim 8, wherein the first end face further includes a second integrally-formed annular resilient rib extending therefrom and the second end face further includes a second annular groove therein, wherein the second resilient rib is receivable by the second annular groove.

10. The sanitary fitting of claim 8, further comprising.
a tubular member having a member end;
the first sealing component radially extending from the member end;
the second sealing component preventing fluid communication with the tubular member through the member end.

11. The sanitary fitting of claim 8, further comprising:
a tubular member having a member end;
the second sealing component radially extending from the member end;
the first sealing component preventing fluid communication with the tubular member through the member end.

12. The sanitary fitting of claim 8, further comprising:
a first tubular member having a first member end;
the first sealing component formed to encapsulate the first member end and be affixed thereto.

13. The sanitary fitting of claim 8, wherein the resilient rib and the second sealing component are formed from a polymer.

14. The sanitary fitting of claim 8, wherein the resilient rib is formed from a first polymer and the second sealing component is formed from a second polymer;
the first polymer having a first durometer;
the second polymer having a second durometer equal to the first durometer.

15. The sanitary fitting of claim 8, wherein the resilient rib is formed from a first polymer and the second sealing component is formed from a second polymer;
the first polymer having a first durometer;
the second polymer having a second durometer different from the first durometer.

16. The sanitary fitting of claim 8, wherein the two extension members have a damp angle therebetween and a clamp inner width between attachment ends sufficient to result in application of compressive force to the first component back surface and to the second component back surface by the two extension members when the outer member is tightened.

* * * * *